(12) United States Patent
Vogt et al.

(10) Patent No.: US 9,091,584 B2
(45) Date of Patent: Jul. 28, 2015

(54) MICROWAVE WINDOW AND LEVEL-MEASURING SYSTEM THAT WORKS ACCORDING TO THE RADAR PRINCIPLE

(71) Applicant: KROHNE Messtechnik GmbH, Duisburg (DE)

(72) Inventors: Michael Vogt, Bochum (DE); Michael Gerding, Bochum (DE); Michael Deilmann, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 320 days.

(21) Appl. No.: 13/660,314

(22) Filed: Oct. 25, 2012

(65) Prior Publication Data

US 2014/0047917 A1    Feb. 20, 2014

(30) Foreign Application Priority Data

Aug. 15, 2012  (DE) .......................... 10 2012 016 120

(51) Int. Cl.
| | |
|---|---|
| *G01F 23/28* | (2006.01) |
| *G01F 23/284* | (2006.01) |
| *H01P 1/08* | (2006.01) |
| *H01Q 1/22* | (2006.01) |
| *H01Q 1/42* | (2006.01) |
| *H01Q 15/08* | (2006.01) |
| *H01Q 19/06* | (2006.01) |
| *G01F 23/296* | (2006.01) |

(52) U.S. Cl.
CPC ............... *G01F 23/284* (2013.01); *H01P 1/08* (2013.01); *H01Q 1/225* (2013.01); *H01Q 1/42* (2013.01); *H01Q 15/08* (2013.01); *H01Q 19/062* (2013.01); *G01F 23/2962* (2013.01)

(58) Field of Classification Search
CPC .. G01F 23/2962; G01F 23/284; G01F 23/296
USPC .............................................. 73/290 V, 290 R
See application file for complete search history.

(56) References Cited

U.S. PATENT DOCUMENTS

| | | | | |
|---|---|---|---|---|
| 4,566,321 A | * | 1/1986 | Zacchio | ....................... 73/290 R |
| 4,670,754 A | * | 6/1987 | Zacchio | ....................... 342/124 |

(Continued)

FOREIGN PATENT DOCUMENTS

| | | |
|---|---|---|
| DE | 44 07 823 A1 | 9/1995 |
| WO | 2011/110560 A1 | 9/2011 |

OTHER PUBLICATIONS

Nils Pohl and Michael Gerding, a Dielectric Lens-Based Antenna Concept for High-Precision Industrial Radar Measurements At 24GHz, Microwave Converence (EUMC), 2012 42nd, European, IEEE, October 29, 2012, pp. 731-734, XP032328276, ISBN: 978-1-4673-2215-7, Section (0001), (0002).

*Primary Examiner* — Hezron E Williams
*Assistant Examiner* — Rodney T Frank
(74) *Attorney, Agent, or Firm* — Roberts Mlotkowski Safran & Cole, P.C.; David S. Safran

(57) ABSTRACT

A microwave window for the spatial, pressure-impervious and diffusion-impervious separation and microwave connection of a first space from/to a second space, and a level-measuring system that works according to the radar principle, is provided with a barrier that has two opposite sides and is at least partially permeable to microwaves. To provide a microwave window that makes possible a reliable sealing of a process space and exact measurement, the microwave window has the barrier designed as a disk on at least one side of which at least one plano-convex dielectric lens, which has an essentially homogenous body.

10 Claims, 3 Drawing Sheets

(56) References Cited

U.S. PATENT DOCUMENTS

| | | | | |
|---|---|---|---|---|
| 5,262,743 A | * | 11/1993 | Jean | 333/252 |
| 5,703,289 A | * | 12/1997 | Mulrooney | 73/290 V |
| 5,770,990 A | | 6/1998 | Lubbers | |
| 6,834,546 B2 | * | 12/2004 | Edvardsson | 73/290 V |
| 8,699,140 B2 | * | 4/2014 | Werner et al. | 359/652 |
| 8,842,038 B2 | * | 9/2014 | Edvardsson | 342/124 |
| 2002/0067229 A1 | | 6/2002 | Lubbers | |
| 2009/0296083 A1 | * | 12/2009 | Saaski et al. | 356/246 |

\* cited by examiner ly small. The invention also addresses the advantage of homogeneity and of a simple configuration that can be economically produced.

MICROWAVE WINDOW AND LEVEL-MEASURING SYSTEM THAT WORKS ACCORDING TO THE RADAR PRINCIPLE

BACKGROUND OF THE INVENTION

1. Field of the Invention

The invention relates to a microwave window for the spatial, pressure-impervious and diffusion-impervious separation and microwave connection of a first space from/to a second space, with a barrier that has two opposite sides and is at least partially permeable to microwaves. Further, the invention relates to a level-measuring system which works according to the radar principle and has the following: at least one electronic component which generates electromagnetic radiation; at least one antenna which radiates electromagnetic radiation and which receives at least one electromagnetic radiation; and at least one microwave window.

2. Description of Related Art

In industrial metrology, radar-based level-measuring devices are often used to determine the levels of media, such as liquids, bulk material, and even slurries, inside of containers, such as tanks or silos. The transit-time method that is implemented by the measuring devices thereby builds on the physical law that states that the travel path (for example, of an electromagnetic signal) is equal to the product of the duration multiplied by the rate of propagation. In the case of measuring the level of a medium—for example, a liquid or a bulk material—in a container, the travel path is equal to twice the distance between an antenna which radiates and then receives back the electromagnetic signal and the surface of the medium. The wanted echo signal, i.e., the signal which is reflected by the surface of the medium and its duration are determined according to the so-called echo function or the digitized envelope curve. The envelope curve represents the amplitudes of the echo signals as a function of the distance: "antenna—surface of the medium". A value of the fill level can subsequently be calculated from the difference between the known distance between the antenna and the bottom of the container and the distance between the surface of the medium and the antenna (which has been determined by the measurement). The sent and received electromagnetic signals are most often microwave radiation.

Depending on the nature of the medium or the prevailing process conditions, the following can prevail inside the containers: low or very high pressures and very low or very high temperatures; furthermore, the media can be very aggressive and/or corrosive. In most cases, it is also necessary for the containers to be sealed so that the media cannot escape into the environment. In order to satisfy such general safety conditions, and especially also for the safety conditions concerning the optionally sensitive components of the measuring devices (for example, the temperature sensitivity of the electronic components), there exist, in the state of the art, the microwave windows that were referred to in the beginning. In the presence of high pressures, such windows are preferably composed of a glass or a ceramic, for example, meta-glass, quartz glass, or borosilicate glass; or, if the necessary compressive strength is reduced, of plastics, such as polypropylene, polytetrafluoroethylene (PTFE), or polyetheretherketone (PEEK).

German Patent DE 195 42 525 C2 and corresponding U.S. Pat. No. 5,770,990 describe a microwave window that is arranged inside of a hollow waveguide. Such hollow waveguides, in general, serve to transfer the electromagnetic signals between one of the electronic components that generate the signals and process the received signals, and the antenna which radiates and receives the electromagnetic signals. The microwave window effects, on the one hand, a pressure-impervious and diffusion-impervious separation between the internal space of the container and the external space. and on the other hand, a transfer of microwaves between the spaces.

Electromagnetic radiation is produced, in general, by the electronic components in the form of spherical waves, which are converted into planar waves for level measurement, and therefore, for emission into the container in which the medium whose level is to be determined resides. The waves, which are reflected by the surface of the medium, are converted back into spherical waves. For this, the prior art provides for the use of lenses (see, for example, International Patent Application Publication WO 2011/110560 A1). In German Patent Application DE 44 07 823 A1, a configuration is described in which lamellae are arranged as an inhomogeneous lens on a plate that separates the antenna from the process space.

SUMMARY OF THE INVENTION

The primary object of the present invention is to provide a microwave window and a level-measuring system equipped therewith that make possible a reliable sealing of a process space and exact measurement.

This object is, according to the invention, then accomplished in large part by the microwave window in question through the following: the barrier is configured as a disk; moreover, at least one dielectric lens, which is comprised of a mostly homogenous body and is plano-convex in configuration, is arranged on at least one side of the barrier. When it is said that the barrier is designed like a disk, it means that the barrier is designed flat with two main side areas that are essentially planar-parallel. The multi-part construction has the advantage that pressure-sensitive and field-shaping components can be manufactured independently, so that, in all, fewer compromises have to be made in designing and producing the microwave window.

Preferably, the barrier is essentially in the form of a cylinder with an essentially circular base, which, having appropriate bordering and pressurization, leads to a mechanical loading that is uniform around the perimeter; this is advantageous in comparison with an angular-bordered or polygonal-bordered base. In addition to the pressure-impervious and diffusion-impervious separation of the two spaces (especially the separation of the process space from the environment), the barrier further serves mostly as both electrical insulation and thermal separation. The barrier is especially configured for level measuring in such a way that it causes as little attenuation as possible of the electromagnetic radiation which passes through it. In one configuration, the height of the barrier is dependent upon the required compressive strength. For example: if it is a glass body with a diameter of about 45 mm, the height will be 20 mm for a compressive strength of up to 40 bar, and 15 mm for a pressure of up to 16 bar.

On at least one side of the barrier there is a dielectric, i.e., composed of a dielectric material, lens that is composed of a body that is essentially homogenous. While the prior art, for example, shows lamellar structures for the production of non-homogeneous lenses (for example, see, German Patent Application DE 44 07 823 A1), then with microwave windows according to the invention, the lens will be formed by a homogenous body, i.e., a body having a uniform structure which, for example, especially has no discontinuities or holes like the lamellae. Moreover, the lens is plano-convex in design and therefore planar on one side and convex on the other. In general, the lens serves to convert spherical waves into planar waves and planar waves into spherical waves. Preferably, the lens makes it possible to focus the waves that have been reflected off the medium into the antenna, so that the measurement accuracy is increased, as losses outside of the process space are avoided.

The microwave window according to the invention is thereby designed in at least two pieces, inasmuch as the barrier and the lens, of which there is at least one, are two separate components. Preferably, a field characteristic impedance of the lens is designed as a function of a field characteristic impedance of the barrier and a field characteristic impedance of the space that is located on the side of the lens that faces away from the barrier.

In one configuration, it is provided that the barrier is at least partially composed of a glass. The barrier is especially a glass which has been enclosed or sealed into a metal ring or another metallic border (for example, as part of a flange). This glass is implemented as inspection glass. Alternately, the barrier is composed of a plastic or a ceramic. Preferably, the barrier (regardless of the selected material) is sealed, flush with the surrounding element—for example, the flange.

In an alternative or ancillary configuration, the at least one lens is at least partially composed of a plastic. Examples of appropriate plastics are: polyetheretherketone (PEEK), polytetrafluoroethylene (PTFE), or polyamide (PA). The lens is particularly designed in one piece and homogenous.

The at least one lens is, in one configuration, attached to the barrier with an adhesive, and in an ancillary or alternative configuration, is clamped relative to the barrier by at least one anchoring device. In an additional configuration, the connection between lens and barrier is created through a screw connection.

At least one coating is provided in one configuration. This coating is located between the at least one lens and the barrier, or is arranged on the side of the at least one lens that faces away from the barrier. In one configuration, there is at least one coating on each side of the lens. In this case, the coating increases, for example, the resistance to environmental influences or fouling. In an alternative or ancillary configuration, the coating serves to ensure that the waves that are reflected at the boundary layers of the microwave window interfere destructively.

In one configuration, the dimensions of the microwave window are as follows: The barrier is pressure-resistant up to essentially 40 bar and is at least partially composed of a borosilicate glass. The height of the barrier is essentially 20 mm with the base having a diameter of essentially 45 mm. The at least one lens is thereby at least partially composed of PEEK with a density of essentially 1.31 g/cubic centimeter. The homogenous lens body is thereby constructed out of a disk-like base, which faces the barrier and has a diameter of essentially 65 mm and a height of essentially 5 mm; and a convex section which is attached to the base and has a height of essentially 2.7 mm and a radius of essentially 95 mm.

Furthermore, in another teaching of the invention of the above-mentioned level-measuring system that works according to the radar principle and has a microwave window designed according to one of the above configurations, the previously derived and indicated object is achieved through the provision of at least one housing which has at least one internal space. In this case, one end of the antenna is arranged in the internal space. The internal space is, at least between the end of the antenna and the microwave window, free of material (meaning, for example, it is only filled with air or is evacuated) and/or free of material that attenuates electromagnetic radiation. Furthermore, electromagnetic radiation that is present in the form of planar waves is focused, via the microwave window, at least partially as electromagnetic radiation in the form of spherical waves into the antenna's phase center. "Phase center" is generally defined as the electronic reference point of the antenna. Viewed from the reception point of the radiation that is radiating from the antenna, the antenna radiation appears to come from this center. The microwave window or, more particularly, the at least one lens or the two lenses in combination with the barrier, focus the waves that have been reflected off of the surface of the medium on the antenna as spherical waves. Furthermore, the window conversely serves to transform the electromagnetic waves that are generated by the electronic components from spherical waves into planar waves. The antenna is, in this case, designed as, for example, a horn radiator, strip-line antenna, or something similar.

In order to reduce the effect of the radiation that has been reflected at the boundary layers, in one configuration, at least one absorber element is provided in the internal space of the housing, which absorber element at least partially absorbs electromagnetic radiation. This is, for example, a foam absorber or an electrically conductive plastic. In an alternative or ancillary configuration, the housing acts at least partially as shielding against electromagnetic radiation, or corresponding shielding is provided either in or on the housing. If the housing is designed especially as partially electrically conductive, there is at least one electrically insulating element located between this electrically conductive section of the housing and the antenna.

With regard to the configuration of the antenna, in one variant, the at least one antenna is arranged along the longitudinal axis of the microwave window. In another configuration, multiple antennas are provided. And in an alternative or ancillary variation, at least one antenna inside of the housing is designed as moveable.

In one configuration, the following dimensions are provided for an electronic component that generates electromagnetic radiation in the frequency range of 80 GHz: The at least one antenna has at least one circular waveguide having an inside diameter of essentially 2.6 mm and one end which widens conically. The antenna itself is, in this case, essentially arranged along the longitudinal axis of the microwave window. The gap between the side of the barrier that faces towards the antenna and the end of the circular waveguide, to which the essentially conically widening end connects, is essentially 50 mm. The essentially conically widening end widens from a diameter of essentially 2.6 mm over a length of 3 mm to a diameter of essentially 4.8 mm.

In particular, there are a number of ways to develop and further improve the microwave window according to the invention and level-measuring system according to the invention. In addition, reference is made to the following description of example embodiments in connection with the accompanying drawings.

DETAILED DESCRIPTION OF THE INVENTION

Figure 1:
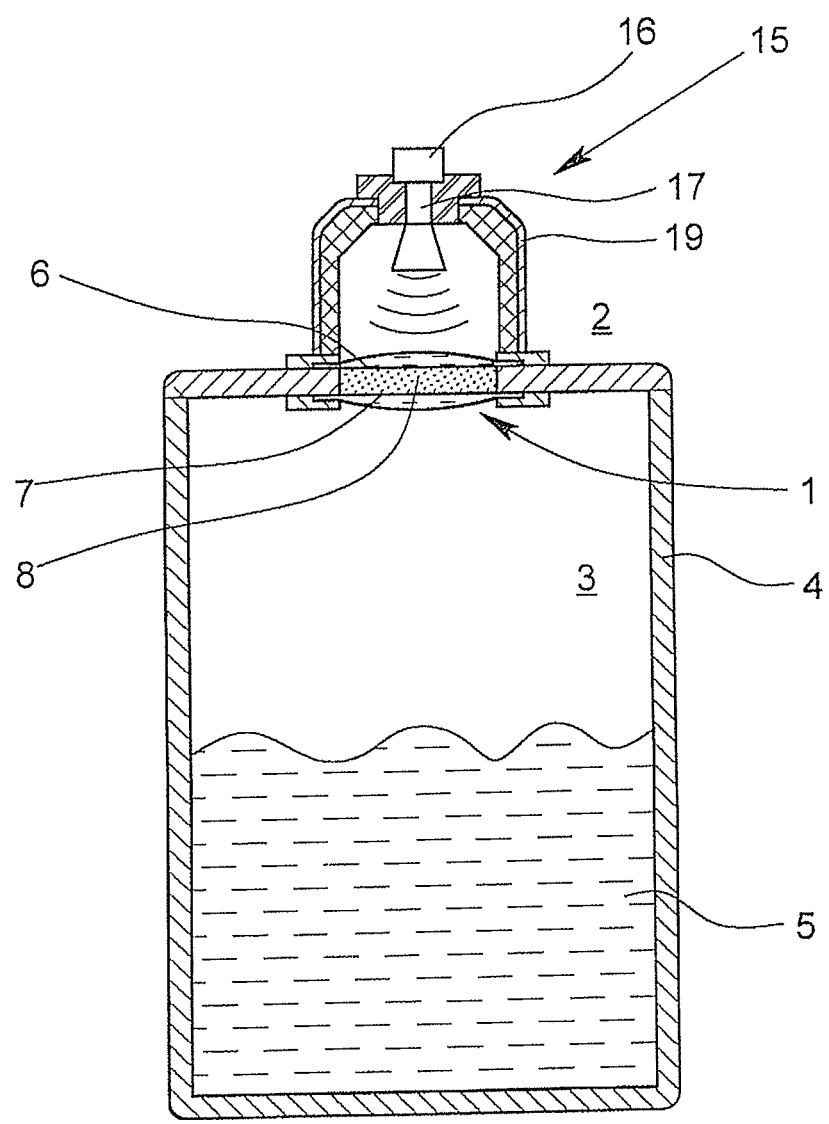
FIG. 1 is a schematic and not-to-scale depiction of a level-measuring system with a level-measuring system according to the invention.

FIG. 1 shows how a microwave window according to the invention is arranged between a first space 2 and a second space 3. The second space 3 is, in this case, the internal space that is encompassed by a container 4 and in which a medium 5 is located. The first space 2 is the environment around the container 4. The microwave window 1 has two sides 6, 7, whereby one side 6 faces towards the first space 2, i.e., here, the environment, and the other side 7 faces towards the internal space of the container 4, i.e., towards the second space 3.

The passage for the microwaves that are used for measuring the level of the medium 5, that is, the measurement signal, is created by the barrier 8, which is composed of a glass, a ceramic, or a plastic and is permeable to microwaves. The microwave window 1 is a part of the level-measuring system 15 with the actual measuring device, which is arranged completely outside of the container 4. This measuring device is depicted here by an electronic component 16, an antenna 17, and a housing 19. Therefore, the level-measuring system 15 comprises altogether a separate measuring apparatus and the window 1, which is incorporated into the container 4. The electromagnetic radiation that is radiated as a measurement signal from the antenna 17, and that is especially microwave radiation, reaches the second space 3 in the container 4 through the microwave window 1. The microwave signals that are reflected by the surface of the medium 5 emerge, by contrast, into the first space 2, which surrounds the container 4, through the microwave window 1 in order to be received by the antenna 17 and to be analyzed or further processed by the electronic component 16.

Figure 2:
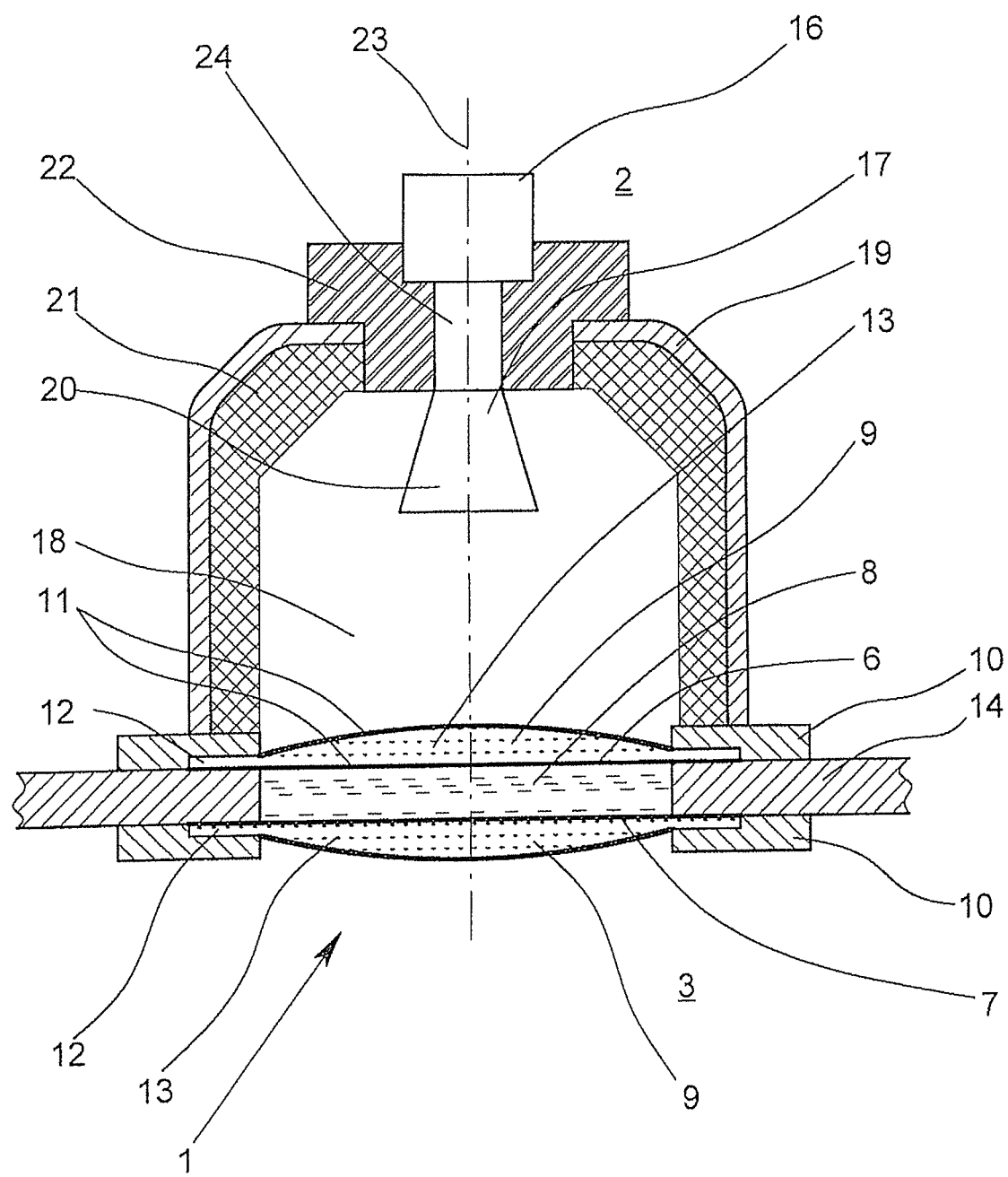
FIG. 2 is a section through a not true-to-scale part of the arrangement from FIG. 1.

In FIG. 2, a schematic section through a microwave window 1 and the measuring system connected to it is depicted. The window 1 separates the first space 2 as the environment from the second space 3 as the process space, and in so doing, simultaneously, allows the passage of microwaves for level measurement. In this configuration, a lens 9 is provided on each of the sides 6, 7, of the barrier 8 facing towards the exterior and the internal area of the container, respectively. Both lenses 9 are, in each case, designed as homogenous bodies and are clamped to the barrier 8 by an anchoring device 10. Between the lenses 9, which are plano-convex, here, and the barrier 8, there is a coating 11 on each of the sides of the lenses 9 facing away from the barrier 8. The lenses 9 have two areas each. A base 12, to which the actual convex section 13 of the lens connects, borders directly on the barrier 8.

The barrier 8 is specially designed as glass, which is fused into the metallic boundary of the flange 14.

Outside of the container, and in the drawing above the window 1, is located the electronic component 16, which is used for the generation and processing of the electromagnetic radiation to be sent and received. The radiating/receiving takes place, here, through an antenna 17, of which an end 20, which expands especially conically, is located in the internal space 18 of the housing 19 which is arranged above the window 1. An absorber element 21 is provided on the inner wall of the housing 19, which absorber element at least partially absorbs electromagnetic radiation which is reflected at the boundary layers of the window 1 or is not optimally focused. So-called antenna ringing is hereby especially reduced; this antenna ringing arises from interfering signals as a result of reflections at the barrier 8 or at the antenna 17.

Here, the housing 19 is made of an electrically conductive material, and thus, to shield against electromagnetic radiation. An electrically insulating element 22 is, therefore, located between the housing 19 and the antenna 17.

The antenna 17 is altogether arranged along the longitudinal axis 23 of the window 1. The longitudinal axis of the circular waveguide 24 is especially oriented as the dominant part of the antenna 17 along this longitudinal axis 23.

It should be recognized that the housing 19 with its associated components rests on the wall of the container and is, therefore, removable from the window 1 without having to open the process space. Mounting of the instrumentation, any replacements, alignment of the antenna 17, etc. can thereby be done without having to open the process space.

Figure 3:
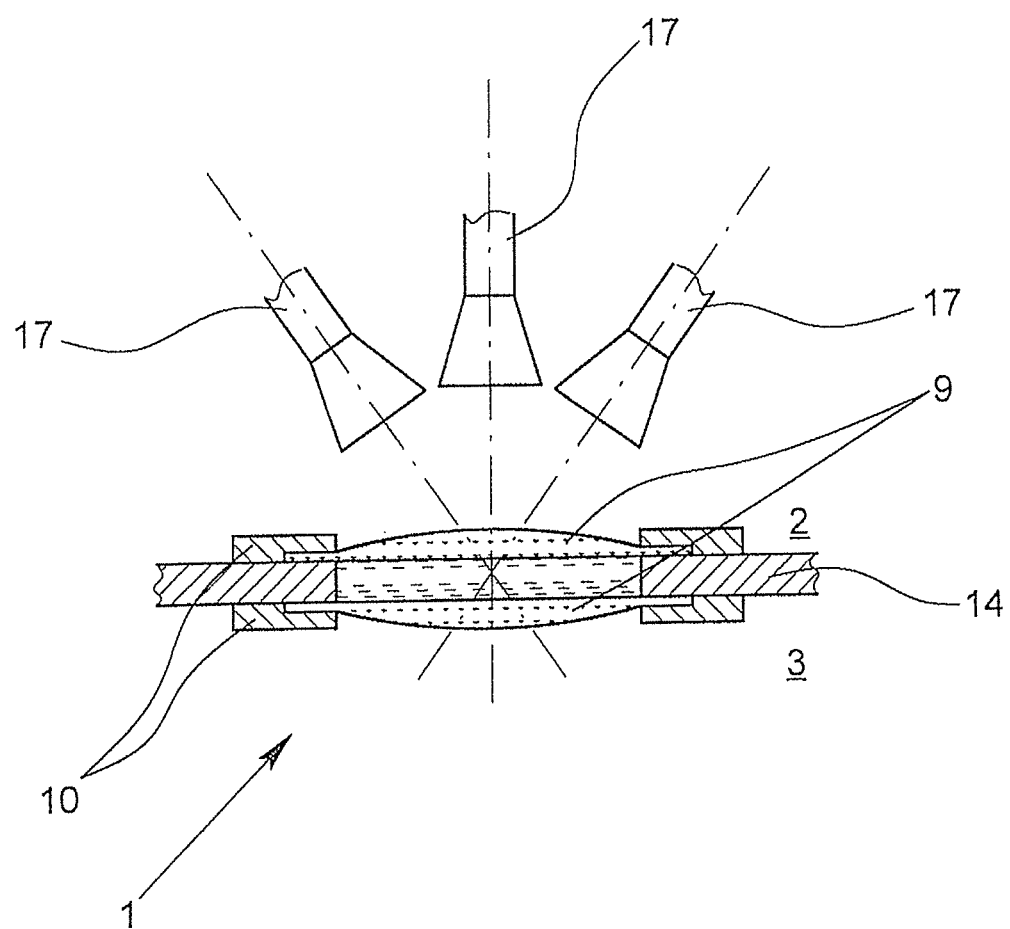
FIG. 3 shows a portion of a design of a level-measuring system that is an alternative variant to that of FIGS. 1 & 2.

In FIG. 3, a variant is depicted in which three antennas 17 are provided. The longitudinal axes of each of the circular waveguides 24 are drawn in, so that it is clear that in each case they run through the same point in the microwave window 1. In a further—not shown—configuration, at least one of the antennas inside of the housing is mounted to be moveable and especially pivotable.

What is claimed is:

1. Microwave window for the spatial, pressure-impervious and diffusion-impervious separation and microwave connection of a first space with a second space, comprising:
   a barrier that has two opposite sides and is at least partially permeable to microwaves, and which is configured in the shape of a disk and
   at least one dielectric lens, which is comprised of an essentially homogenous body and is plano-convex, arranged on at least one side of the barrier,
   wherein said barrier and said lens are separate components,
   wherein said barrier is at least partially composed of a glass, and
   wherein said at least one lens is at least partially composed of plastic.

2. Microwave window according to claim 1, wherein the barrier is essentially configured in the form of a cylinder with an essentially circular base.

3. Microwave window according to claim 1, wherein the plastic of which the at least one lens is at least partially composed is a plastic from the group consisting of PEEK, PTFE, and PA.

4. Microwave window according to claim 1, wherein at least one coating is arranged at least one of between the at least one lens and the barrier, and arranged on a side of the at least one lens that faces away from the barrier.

5. Microwave window for the spatial, pressure-impervious and diffusion-impervious separation and microwave connection of a first space with a second space, comprising:
   a barrier that has two opposite sides, is at least partially permeable to microwaves, and is configured in the shape of a disk and
   at least one dielectric lens, which is comprised of an essentially homogenous body and is plano-convex,
   wherein said at least one dielectric lens comprises a lens arranged on each of opposite sides of the barrier.

6. A level-measuring system that is operable according to the radar principle, comprising:
   at least one housing that has at least one internal space,
   at least one electronic component that generates electromagnetic radiation,
   at least one antenna that radiates electromagnetic radiation and receives electromagnetic radiation, and
   at least one microwave window separating said at least one internal space from a second space,
   said at least one microwave window comprising a barrier that has two opposite sides and is at least partially permeable to microwaves, and which is configured in the shape of a disk and at least one dielectric lens, which is comprised of an essentially homogenous, plano-convex body that is arranged on at least one side of the barrier, wherein one end of the at least one antenna is arranged in the internal space;

wherein the internal space is free of material that attenuates electromagnetic radiation, at least between the end of the antenna and the microwave window;

wherein the microwave window is constructed for focusing electromagnetic radiation present in the form of planar waves at least partially as electromagnetic radiation in the form of spherical waves into a phase center of the antenna;

wherein said barrier and said lens are separate components, wherein said barrier is at least partially composed of a glass, and wherein said at least one lens is at least partially composed of a plastic.

7. Level-measuring system according to claim 6, wherein said at least one antenna is arranged along a longitudinal axis of the microwave window.

8. Level-measuring system according to claim 6, wherein said at least one antenna comprises a plurality of antennae.

9. Level-measuring system according to claim 6, wherein said at least one antenna is mounted in a pivotable manner.

10. A level-measuring system that is operable according to the radar principle, comprising:

at least one housing that has at least one internal space, at least one electronic component that generates electromagnetic radiation, at least one antenna that radiates electromagnetic radiation and receives electromagnetic radiation, and at least one microwave window separating said at least one internal space from a second space, said at least one microwave window comprising a barrier that has two opposite sides, is at least partially permeable to microwaves, and is configured in the shape of a disk and at least one dielectric lens which is comprised of an essentially homogenous, plano-convex body, wherein one end of the at least one antenna is arranged in the internal space;

wherein the internal space is free of material that attenuates electromagnetic radiation, at least between said one end of the antenna and the microwave window;

wherein the microwave window is constructed for focusing electromagnetic radiation present in the form of planar waves at least partially as electromagnetic radiation in the form of spherical waves into a phase center of the antenna; and wherein said at least open dielectric lens comprises a lens arranged on each of opposite sides of the barrier.

* * * * *